(12) United States Patent
Okura et al.

(10) Patent No.: US 11,146,142 B2
(45) Date of Patent: Oct. 12, 2021

(54) STEPPING MOTOR

(71) Applicant: MINEBEA MITSUMI Inc., Nagano (JP)

(72) Inventors: Suguru Okura, Fukuroi (JP); Nobuyuki Sueyoshi, Kosai (JP); Kazuo Muramatsu, Fukuroi (JP); Shoji Yoshitomi, Fukuroi (JP); Hiroaki Fujii, Iwata (JP)

(73) Assignee: MINEBEA MITSUMI INC., Nagano (JP)

(*) Notice: Subject to any disclaimer, the term of this patent is extended or adjusted under 35 U.S.C. 154(b) by 176 days.

(21) Appl. No.: 16/489,166

(22) PCT Filed: Mar. 2, 2018

(86) PCT No.: PCT/JP2018/007978
§ 371 (c)(1),
(2) Date: Aug. 27, 2019

(87) PCT Pub. No.: WO2018/159807
PCT Pub. Date: Sep. 7, 2018

(65) Prior Publication Data
US 2020/0014279 A1 Jan. 9, 2020

(30) Foreign Application Priority Data
Mar. 3, 2017 (JP) .............................. JP2017-040174

(51) Int. Cl.
*H02K 5/24* (2006.01)
*H02K 5/16* (2006.01)
*H02K 7/16* (2006.01)

(52) U.S. Cl.
CPC .............. *H02K 5/24* (2013.01); *H02K 5/161* (2013.01); *H02K 7/16* (2013.01)

(58) Field of Classification Search
CPC .. H02K 5/24; H02K 5/16; H02K 7/16; H02K 5/167; H02K 1/18; H02K 3/52; H02K 5/15; H02K 11/00
See application file for complete search history.

(56) References Cited

U.S. PATENT DOCUMENTS 7,053,517 B2* 5/2006 Suzuki ................... H02K 3/325
310/257
7,414,340 B2* 8/2008 Agematsu .............. H02K 7/083
310/216.124

(Continued)

FOREIGN PATENT DOCUMENTS

CN 101034843 A 9/2007
CN 201663534 U 12/2010

(Continued)

OTHER PUBLICATIONS

JP-2011097748 machine translation on Apr. 23, 2021.*

(Continued)

*Primary Examiner* — Tran N Nguyen
*Assistant Examiner* — Leda T Pham
(74) *Attorney, Agent, or Firm* — Pearne & Gordon LLP (57) ABSTRACT

Noise caused by a gap between a rotor and a plate can be suppressed even when there are dimensional variations in members or assembly states. In a configuration of a stepping motor including front side and end side stator assemblies (200, 300), a rotor (400) provided with a rotor member (402) and a shaft (403) that are accommodated in the stator assemblies (200, 300), and a front plate (210) and an end plate (310) that are arranged on both sides of the stator assemblies (200, 300) in an axial direction, and are configured to couple the stator assemblies (200, 300), a projection (700) in an annular shape is provided on a surface of the front plate (210) facing the rotor member (402) to protrude toward the rotor member (402), a coil spring (800) that is (Continued)

interposed between the front plate (210) and the rotor member (402) is accommodated in the inner side of the projection (700), and the rotor (400) is urged toward the end plate (310) by the coil spring to be elastically pressed against the end plate (310).

9 Claims, 4 Drawing Sheets

(56) References Cited

U.S. PATENT DOCUMENTS

| | | | |
|---|---|---|---|
| 9,692,274 B2* | 6/2017 | Furubayashi | H02K 7/08 |
| 2007/0170797 A1 | 7/2007 | Agematsu | |
| 2008/0088209 A1* | 4/2008 | Ryu | H02K 7/06 |
| | | | 310/49.01 |
| 2012/0038231 A1 | 2/2012 | Oda et al. | |
| 2014/0028128 A1 | 1/2014 | Yoshitomi et al. | |
| 2014/0167534 A1* | 6/2014 | Hata | H02K 5/15 |
| | | | 310/49.01 |

FOREIGN PATENT DOCUMENTS

| | | |
|---|---|---|
| CN | 203482024 U | 3/2014 |
| CN | 203491872 U | 3/2014 |
| JP | 08-182298 A | 7/1996 |
| JP | 2002-209361 A | 7/2002 |
| JP | 2007-202240 A | 8/2007 |
| JP | 3163956 U | 11/2010 |
| JP | 2011097748 A * | 5/2011 |
| JP | 102089959 A | 6/2011 |
| JP | 2014-027843 A | 2/2014 |

OTHER PUBLICATIONS

International Search Report for corresponding International Application No. PCT/JP2018/007978 dated May 22, 2018.
Written Opinion for corresponding International Application No. PCT/JP2018/007978 dated May 22, 2018.
International Preliminary Report on Patentability for corresponding International Application No. PCT/JP2018/007978 dated Sep. 3, 2019.
English translation of Written Opinion for corresponding International Application No. PCT/JP2018/007978 dated May 22, 2018.
Chinese Office Action dated Nov. 2, 2020 for corresponding Chinese Application No. 201880014143.4.
Notice of Reasons for Refusal dated Feb. 3, 2021 for corresponding Japanese Application No. 2017-040174 and English translation.
Second Office Action dated Apr. 25, 2021 for corresponding Chinese Application No. 201880014143.4 and English translation.

* cited by examiner

PRIOR ART

FIG. 7

STEPPING MOTOR

TECHNICAL FIELD

The present invention relates to a stepping motor.

BACKGROUND ART

Figure 7:
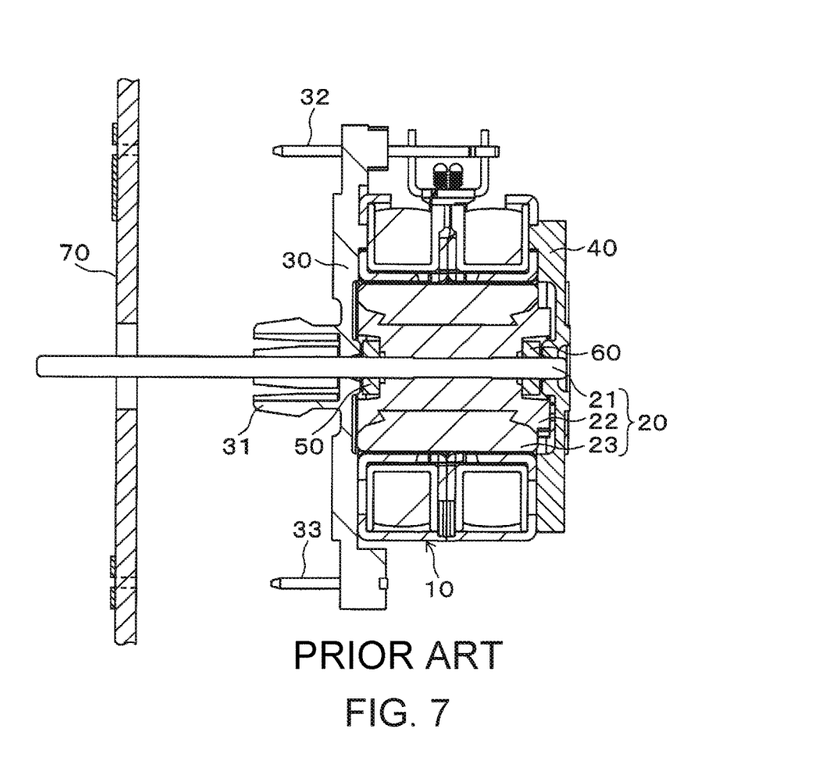
FIG. 7 A cross-sectional view of a conventional stepping motor.

A stepping motor that is directly secured to a circuit board has been conventionally known (for example, see Patent Literature 1). FIG. 7 illustrates a stepping motor similar to that disclosed in Patent Literature 1. This motor has a structure in which a rotor 20 comprised of a shaft 21, a rotor member 22, and a rotor magnet 23 is accommodated in an inner side of a stator 10, and a front plate 30 and an end plate 40 are secured to both sides of the stator 10 in an axial direction, and is configured to be secured to a circuit board 70.

The front plate 30 includes a positioning pin (not illustrated) that serves to position the front plate 30 at the circuit board 70, a boss part 31 that is to be fitted to the circuit board 70, a terminal pin 32 that is made to be soldered to the circuit board 70, and a securing pin 33 that is made to be soldered to the circuit board 70 and does not function as an electrode. The motor is configured to be secured to the circuit board 70 by fitting the boss part 31 into the circuit board 70, and soldering the terminal pin 32 and the securing pin 33 directly to the circuit board 70. This motor has a structure in which rubber washers 50 and 60 fitted to the shaft 21 are interposed between the rotor member 22 of the rotor 20 and the front plate 30 and between the rotor member 22 of the rotor 20 and the end plate 40, respectively, so that an impact caused by axial rattling at the rotor 20 is absorbed by the rubber washers 50 and 60.

DOCUMENT LIST

Patent Literature

Patent Literature 1: Japanese Patent Application Publication No. 2014-027843

SUMMARY OF INVENTION

Technical Problem

In the motor illustrated in FIG. 7, if there are dimensional variations in members or assembly states, the rubber washers 50 and 60 each which are set to a fixed height dimension (a thickness in the axial direction) may cause gaps between the rubber washers 50 and 60 and the rotor member 22 of the rotor 20 during the assembly. If such gaps are generated, axial rattling at the rotor 20 cannot be absorbed, and the rotor member 22 impacts on the rubber washers 50 and 60, thereby causing the noise. When the above-described variations are caused, it is supposed that the thicknesses of the rubber washers 50 and 60 are adjusted in accordance with the variations, but it is necessary to prepare various kinds of rubber washers that are different in thickness for variation adjustment. As a result, the number of components is increased and the working efficiency is lowered, resulting in increase in cost.

The present invention has been made in view of the above-described circumstances, and it is an object of the present invention to provide a stepping motor capable of suppressing noise caused by a gap between a rotor and a plate that are arranged in an axial direction even when there are dimensional variations in members or assembly states, and obtaining such a structure without causing increase in cost.

Solution to Problem

A stepping motor of the present invention is characterized by including a rotor having a shaft, a stator that is arranged in proximity to the rotor, and a plate that is arranged to face one end side of the rotor in an axial direction and has a supporting portion for supporting the shaft, wherein the plate has a projection in an annular shape on a surface facing the rotor, the projection protruding toward the rotor and surrounding the shaft, and a coil spring is provided to be interposed between the plate and the rotor in a state in which the coil spring is fitted on the shaft on an inner side of the projection, and to urge the rotor toward another end in the axial direction to elastically press the rotor against another member.

According to the present invention, the rotor urged by the coil spring is elastically pressed against the other member. Therefore, noise caused by a gap between the rotor and the plate that are arranged in the axial direction can be suppressed even when there are dimensional variations in members or assembly states. Furthermore, since the structure is simple, the noise can be suppressed without causing increase in cost. Note that the phrase "elastically press the rotor against another member" used herein includes not only an embodiment in a state in which the rotor directly contacts another member but also a case where a member such as a washer is interposed between the rotor and the other member.

The present invention includes an embodiment in which an axial height of the projection protruding toward the rotor is higher than a solid height of the coil spring. According to this embodiment, when the rotor moves toward the plate upon receipt of a large force, for example, the rotor contacts the projection before the height of the coil spring reaches the compressed height. Therefore, the damage to the coil spring can be prevented.

The present invention includes an embodiment in which the plate includes a terminal block part on which a terminal pin to which a coil of the stator is to be connected is provided, and a flange part, wherein the flange part is provided with a securing pin for securing the plate to a securing member. According to this embodiment, the stepping motor of the present invention can be secured to the securing member with the securing pin.

The present invention includes an embodiment in which the flange part of the plate extends in a radial direction, and a plurality of the flange parts are formed.

The present invention includes an embodiment in which the other member is a plate that is arranged on another end side of the rotor in the axial direction.

Effects of Invention

According to a stepping motor of the present invention, noise caused by a gap between a rotor and a plate that are arranged in an axial direction can be suppressed even when there are dimensional variations in members or assembly states, and such a structure can be obtained without causing increase in cost.

DESCRIPTION OF EMBODIMENTS

Hereinafter, embodiments of the present invention will be described with reference to the drawings.

1 First Embodiment

[1-1] Configuration of Stepping Motor

Figure 1A:
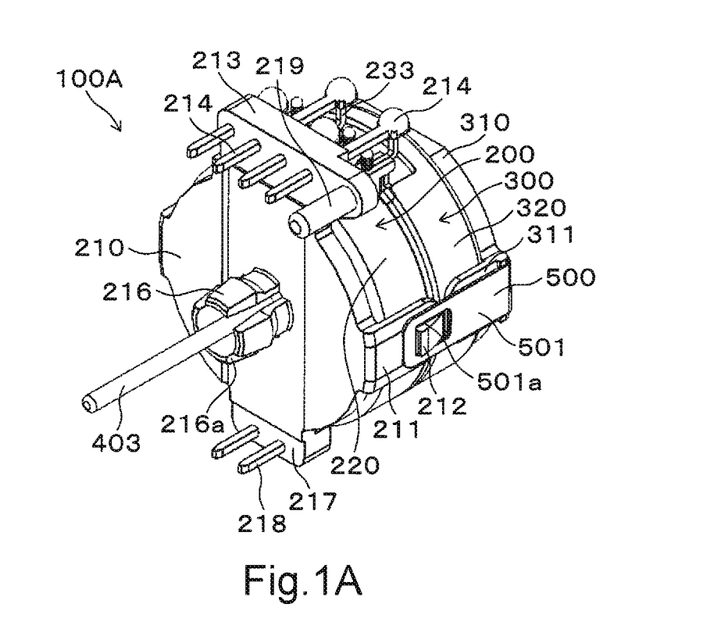
FIG. 1 A perspective view of a stepping motor according to one embodiment of the present invention.
Figure 1B:
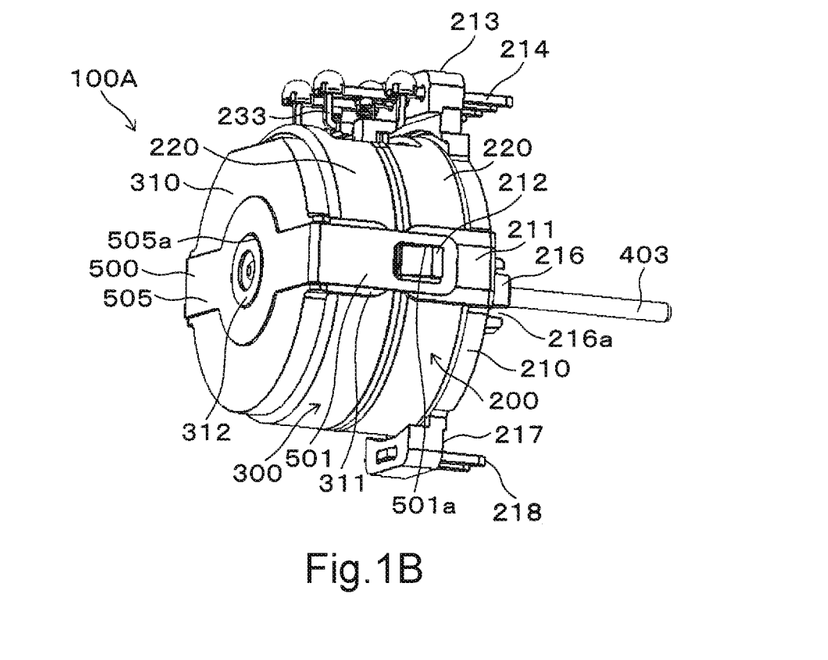
Figure 2:
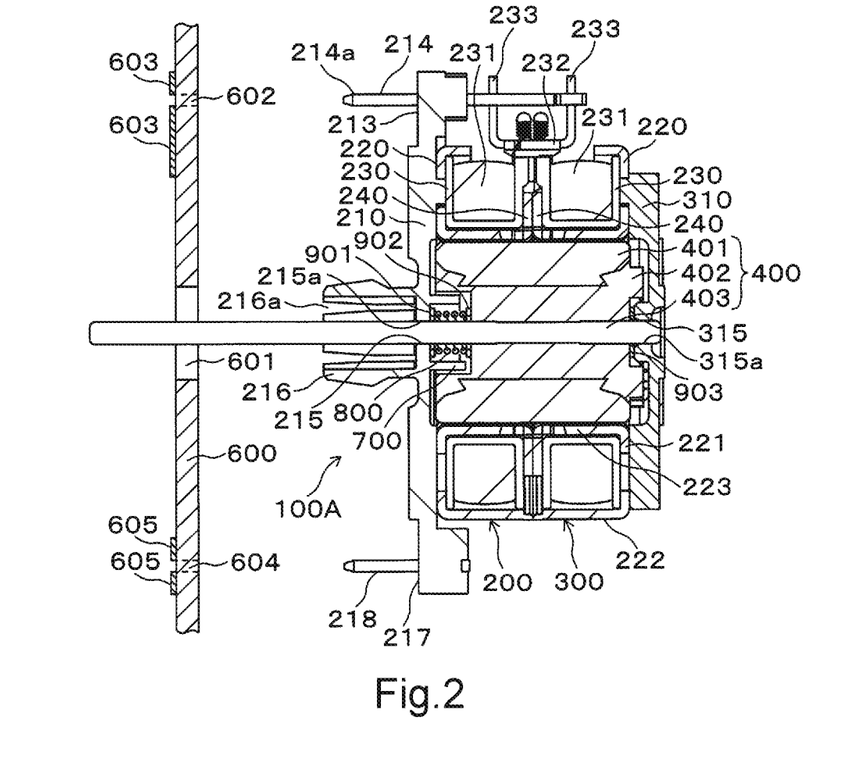
FIG. 2 A cross-sectional view of the stepping motor of one embodiment.

FIG. 1 and FIG. 2 each illustrate a claw pole stepping motor 100A of a first embodiment. The stepping motor 100A has a structure, as a stator structure, in which a front side stator assembly (stator) 200 in an annular shape and an end side stator assembly (stator) 300 in an annular shape are joined coaxially with each other, and a rotor 400 having a shaft 403 is accommodated in the inside of such a structure in a rotatable manner. The stator assemblies 200 and 300 are sandwiched between a front plate 210 in a disk shape and an end plate (another member) 310 in a disk shape, the front plate 210 and the end plate 310 being arranged on outer sides of the stator assemblies 200 and 300 in the axial direction, respectively, so that these plates 210 and 310 maintain the coupling state between the stator assemblies 200 and 300, which forms the stepping motor 100A.

Reference numeral 600 in FIG. 2 denotes a circuit board (securing member) on which various electronic devices are mounted, and the stepping motor 100A is secured to this circuit board 600 in a state in which the front plate 210 is fitted to the circuit board 600.

The front side stator assembly 200 and the end side stator assembly 300 have the same configuration, and each of the front side stator assembly 200 and the end side stator assembly 300 includes an outer yoke 220 in a cup shape, a bobbin 230, and an inner yoke 240 in a disk shape. As illustrated in FIG. 2, the outer yoke 220 includes a bottom surface portion 221 in an annular shape, and a cylindrical portion 222 that extends from an outer peripheral edge of the bottom surface portion 221 in the axial direction, in which a plurality of pole teeth 223 in a comb shape are provided in a standing condition in the axial direction at a peripheral edge of an opening which is formed in the center of the bottom surface portion 221. On the other hand, in the inner yoke 240, a plurality of pole teeth (not illustrated) in a comb shape are provided in a standing condition in the axial direction at the peripheral edge of the central opening. The outer yoke 220 and the inner yoke 240 are combined with each other so that the respective pole teeth are engaged alternately through a predetermined gap.

The bobbin 230, made of a resin, around which a coil 231 is wound is accommodated in a space in an annular shape in the outer yoke 220 and the inner yoke 240 that are combined with each other as described above. The bobbin 230 includes a terminal part 232. In the terminal part 232, a terminal 233 made of metal is embedded, to which the end of the winding of the coil 231 is fastened and connected. The stator assemblies 200 and 300 configured as described above are joined to each other in a state in which the respective inner yokes 240 face each other so that the direction of the stator assembly 200 in the axial direction becomes opposite to the direction of the stator assembly 300 in the axial direction.

The front plate 210 forms a front side housing, and is made of a resin. As illustrated in FIG. 1, the front plate 210 has a pair of left and right band-joints 211 at an outer edge of the front plate 210, the band-joints 211 each extending in a direction of the end side stator assembly 300. The band-joint 211 is provided with a claw 212 protruding to the outer side. The band-joint 211 is joined with a band 500, so that the front side stator assembly 200 and the end side stator assembly 300 are joined to each other.

In the front plate 210 illustrated in FIG. 1 and FIG. 2, a terminal block part 213 is integrally formed on the upper portion of the front plate 210, and a securing pin arranging part 217 is integrally formed on the lower portion of the front plate 210. Furthermore, at a center of the front plate 210, a boss part 216 in a substantially cylindrical shape is integrally formed, the boss part 216 protruding to the outer side in the axial direction.

Four terminal pins 214 extending in the axial direction are embedded in the terminal block part 213. The terminal pins 214 serve as current conducting terminals to the circuit board 600 illustrated in FIG. 2. One end portion of the terminal pin 214 is secured to the circuit board 600, and another end portion of the terminal pin 214 is connected to the above-described terminal 233.

The securing pin arranging part 217 is provided at a position symmetrical to the terminal block part 213, with the boss part 216 as the center. Two securing pins 218 protruding in the axial direction are secured to the securing pin arranging part 217. The securing pins 218 are metal members formed in a substantially U-shape, and are press-fitted and secured in respective holes that are provided in the securing pin arranging part 217. The securing pins 218 are members that serve to secure the stepping motor 100A to the circuit board 600 and are made from a material that can be soldered, but they do not function as current conducting terminals.

A plurality of slits 216a extending in the axial direction are formed in the boss part 216. The inner diameter of the boss part 216 is slightly larger than the diameter of the shaft 403 so that the shaft 403 passes through the boss part 216. A bearing hole 215 through which the shaft 403 passes is formed in the center of the front plate 210. The shaft 403 contacts an inner peripheral surface (supporting portion) 215a of the bearing hole 215 in a slidable manner, and is rotatably supported by the inner peripheral surface 215a.

As illustrated in FIG. 1, a positioning pin 219 extending in the axial direction is integrally formed on the terminal block part 213 of the front plate 210. The positioning pin 219 is fitted in a positioning hole (not illustrated) that is provided on the circuit board 600, whereby the stepping motor 100A is positioned with respective to the circuit board 600.

The end plate 310 of the end side stator assembly 300 forms an end side housing, and is made of a resin. As illustrated in FIG. 1, the end plate 310 has a pair of left and right band-contacts 311 that extend in a direction of the front side stator assembly 200 to face the above-described band-joints 211. As illustrated in FIG. 2, a bearing hole 315 through which the shaft 403 passes is formed in the center of the end plate 310. The shaft 403 contacts an inner peripheral surface (supporting portion) 315a of the bearing hole 315 in a slidable manner, and is rotatably supported by the inner peripheral surface 315a.

As illustrated in FIG. 2, a rotor 400 is comprised of a rotor member 402 in a cylindrical shape, a rotor magnet 401 that is secured to the outer periphery of the rotor member 402, and the shaft 403 that passes through and is secured in the center of axis of the rotor member 402. The rotor magnet 401 has a structure of magnetic poles in which the magnetic poles are alternately magnetized, such as NSNS in a circumferential direction. The shaft 403 passes through the bearing holes 215 and 315 that are provided in the front plate 210 and the end plate 310, respectively, as described above, and is rotatably supported by making direct contact with the inner peripheral surfaces 215a and 315a of the bearing holes 215 and 315 in a slidable manner. Note that a configuration may be adopted in which the shaft 403 is rotatably supported through bearing devices such as rolling bearings with respect to the front plate 210 and the end plate 310.

As illustrated in FIG. 1, the band 500 is a member that is formed in a substantially U-shape and is made of metal material having elasticity. The band 500 includes a main body 505 that is placed on and assembled to the outer surface of the end plate 310, and a pair of left and right arms 501 that extend from the main body 505 in the direction of the front side stator assembly 200. The band 500 is assembled to the end plate 310 by fitting a protruding part 312 that is formed at the center of the outer surface of the end plate 310 in the hole 505a that is formed at the center portion of the main body 505.

Each of arms 501 of the band 500 is provided with a rectangular hole 501a. The claw 212 of the band-joint 211 that is provided at the front plate 210 becomes hooked in this hole 501a, whereby the band 500 engages with the front plate 210, so that the front side stator assembly 200 and the end side stator assembly 300 are joined to each other. The arm 501 of the band 500 contacts the outer side of the band contact 311 that is provided at the end plate 310, and the hole 501a is hooked to the claw 212 in a state in which the band 500 is in an elastically deformed. Thus, the plates 210 and 310 are attracted each other and are tightly joined, and the band 500 is prevented from being detached from the front plate 210.

As illustrated in FIG. 2, a boss fitting hole 601, a contact hole 602, and a pin securing hole 604 are formed in the circuit board 600. In addition, the above-described positioning hole (not illustrated) is formed. To secure the stepping motor 100A of the present embodiment to the circuit board 600, the front plate 210 is fitted to the circuit board 600 in a state in which the positioning pin 219 is fitted in the above-described positioning hole, the boss part 216 is pushed into and fitted in the boss fitting hole 601, an end portion 214a of the terminal pin 214 is inserted into the contact hole 602, and the securing pin 218 is inserted into the pin securing hole 604. A copper foil 603 forming a printed pattern that is formed around the contact hole 602 and the terminal pin 214 are connected by soldering, and a copper foil 605 that is formed around the pin securing hole 604 and the securing pin 218 are connected by soldering, whereby the stepping motor 100A is secured to the circuit board 600.

[1-2] Structure for Supporting Rotor in Axial Direction

The stepping motor 100A of the present embodiment has a structure in which axial rattling at the rotor 400 is suppressed to suppress the noise. Hereinafter, the structure will be described.

Figure 3A:
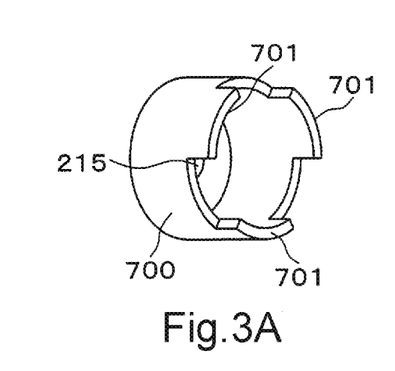
FIG. 3A A perspective view of a projection of a front plate.
Figure 3B:
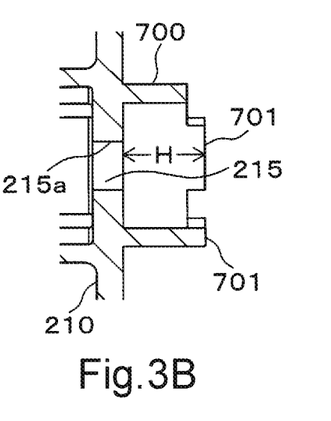
FIG. 3B A cross sectional view of the projection of the front plate.

As illustrated in FIG. 2, a projection 700 in an annular shape is integrally formed around the bearing hole 215 in the inner surface of the front plate 210, that is, a surface facing the rotor 400. As illustrated in FIGS. 3A and 3B, this projection 700 is provided with a plurality of bosses 701 (in this case, three) that are formed at an equal interval at the tip edge portion of the projection 700. The shaft 403 of the rotor 400 is inserted into this projection 700. A coil spring 800 is accommodated in this projection 700 in a state in which the coil spring 800 is fitted on the shaft 403. The coil spring 800 in a compressed state is interposed between the front plate 210 and the rotor member 402.

Washers 901 and 902 made of a material such as a resin with good slidability are interposed between the coil spring 800 and the front plate 210 and between the coil spring 800 and the rotor member 402, respectively. Similarly, a washer 903 is interposed between the rotor member 402 and the end plate 310. All of the washers 901 to 903 are fitted on the shaft 403. As illustrated in FIG. 3B, the maximum height H of the projection 700 in which the coil spring 800 is accommodated, that is, the axial dimension from the bottom surface (the inner surface of the front plate 210) in the projection 700 to the tip end surface of the boss 701 is set to be higher than the solid height of the coil spring 800 (the height in the state of tight contact between adjacent coils).

The coil spring 800 protrudes from the end surface of the boss 701 of the projection 700, and urges the rotor member 402 toward the end plate 310 through the washer 902. Thus, the rotor member 402 is elastically pressed against the end plate 310 through the washer 903, and a gap is formed between the rotor member 402 and the end surfaces of the bosses 701 that face each other.

[1-3] Function and Effect

In the present embodiment, the rotor 400 is urged toward the end plate 310 through the coil spring 800, and the rotor member 402 is always elastically pressed against the end plate 310 through the washer 903, thereby restricting the movement in the axial direction. Thus, even when there are variations in members forming the stepping motor 100A or assembly states, axial rattling at the rotor 400 is absorbed, thereby suppressing the occurrence of noise. The simple structure enables the noise to be suppressed without causing increase in cost. Since the height of the projection 700 protruding toward the rotor 400 is higher than the solid height of the coil spring 800, the height of the coil spring 800 is not reduced to the compressed height even when the rotor 400 moves toward the front plate 210 upon receipt of an unexpected large force resulting in the end surface of the rotor member 402 contacting the end surfaces of the bosses 701 of the projection 700, for example. Therefore, the damage to the coil spring 800 can be prevented.

Since a plurality of bosses 701 are formed on the end surface of the projection 700, the end surface of the projection 700 on which the rotor member 402 contacts is not an annular flat surface around the entire circumferential surface. Therefore, the maximum height dimension of the projection 700 can be obtained with high accuracy using these bosses, whereby the high accuracy can be easily obtained in the maximum height dimension and the flatness of the end surface of the projection 700. Furthermore, the area of a portion where the rotor member 402 contacts and slides on the projection 700 when the rotor 400 rotates can be reduced, thereby reducing the friction between them. From the viewpoint of reducing the friction, the bosses 701 can be formed in a circular-arc shape to contact the rotor member 402 at points or in a state close to point contact.

2 Second Embodiment

Next, a stepping motor 100B according to a second embodiment of the present invention will be described with reference to FIG. 4 to FIG. 6. The stepping motor 100B of the second embodiment is different from the stepping motor 100A of the first embodiment in the coupling means between the front side stator assembly 200 and the end side stator assembly 300, and the configuration of the front plate. In the stepping motor 100B of the second embodiment, the configuration of the stator assemblies 200 and 300 and the rotor 400 is similar to that of the first embodiment, and thus the same reference numerals are denoted for the same components and the description thereof will be omitted or simplified. Hereinafter, differences will be described. Note that the rotor 400 of the second embodiment includes the rotor member 402 that is provided with a rotor magnet (not illustrated) on the outer peripheral surface, and the shaft 403 that passes through and is secured in the center of axis of the rotor member 402.

The coupling means between the front side stator assembly 200 and the end side stator assembly 300 in the second embodiment is resin molding, and the end plate 350 is formed at the same time in the resin molding process. To perform the resin molding, as illustrated in FIG. 6, the stator assemblies 200 and 300 in a state in which the bobbin 230 around which the coil 231 is wound is accommodated at the inner side and the pole teeth 223 of the outer yoke 220 and the pole teeth 243 of the inner yoke 240 are engaged alternately through a predetermined gap are placed in the molding assembly (not illustrated) in the state in which the bottom surface portions 221 of the outer yokes 220 face each other and coaxially overlap with each other. That is, contrary to the first embodiment, in the second embodiment, the outer yoke 220 is arranged at the axial inner side and the inner yoke 240 is arranged at the axial outer side.

A thermoplastic resin is filled into a space between the pole teeth 223 and 243 by injecting the resin into the mold, and then the stator assemblies 200 and 300 are integrally molded with the resin. At the same time, the end plate 350 in a disk shape is molded on the outer side of the end side stator assembly 300, with the resin.

After resin molding as described above, the front plate 250 is superimposed on the outer surface of the inner yoke 240 of the front side stator assembly 200 which is a formed body taken out of the mold. As illustrated in FIG. 5 and FIG. 6, the peripheral edge of the cylindrical portion 222 of the outer yoke 220 in the front side stator assembly 200 is caulked to three notches 252 that are formed at substantially equal positions on the outer peripheral edge of the front plate 250, thereby obtaining the stepping motor 100B of the second embodiment. The number of portions to be caulked using the notches 252 is not limited to three, and it is sufficient that two or more portions are caulked.

Next, the front plate 250 of the second embodiment will be described. As illustrated in FIG. 4 and FIG. 5, the front plate 250 is positioned coaxially with respect to the front side stator assembly 200, and includes mainly a disk portion 251 that covers the front side stator assembly 200, and flange parts 253 that extend outward in the radial direction of the disk portion 251 are formed on both side of the disk portion 251, respectively. As illustrated in FIG. 5, each of the flange parts 253 extends obliquely upward from the edge portion of the disk portion 251 in a substantially lower-half portion of the disk portion 251, and has uniform width, and has a tip end formed in a semi-circular arcuate shape.

Figure 6:
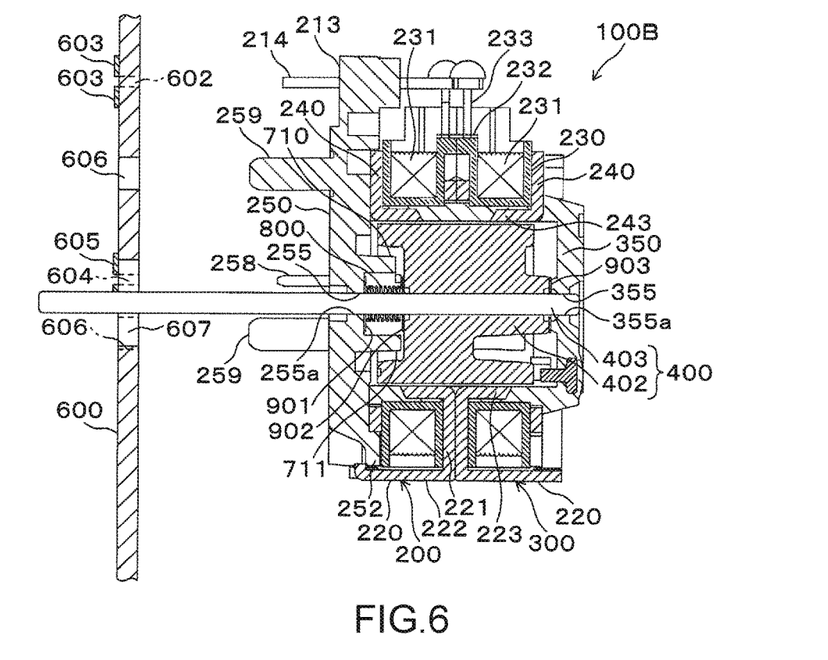
FIG. 6 A cross-sectional view of the stepping motor of the other embodiment.

As illustrated in FIG. 6, a bearing hole 255 for the shaft 403 is formed at the center of the disk portion 251. On the other hand, a bearing hole 355 for the shaft 403 is also formed in the end plate 350. Similarly to the first embodiment, the shaft 403 passes through the bearing holes 255 and 355 that are formed in the front plate 250 and the end plate 350, respectively, and directly contacts an inner peripheral surfaces 255a and 355a of the bearing holes 255 and 355 in a slidable manner, and is rotatably supported.

Figure 4:
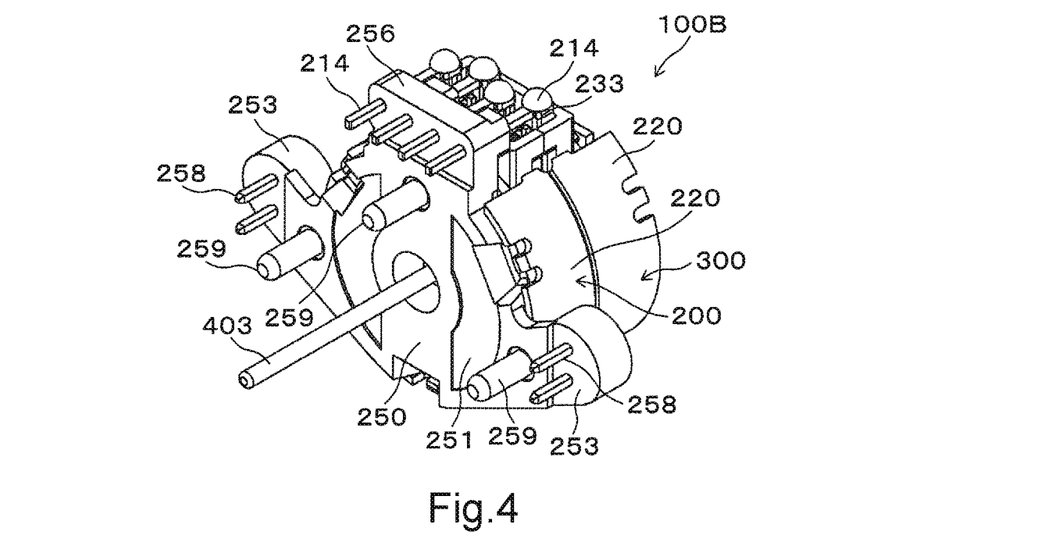
FIG. 4 A perspective view of a stepping motor according to another embodiment of the present invention.
Figure 5:
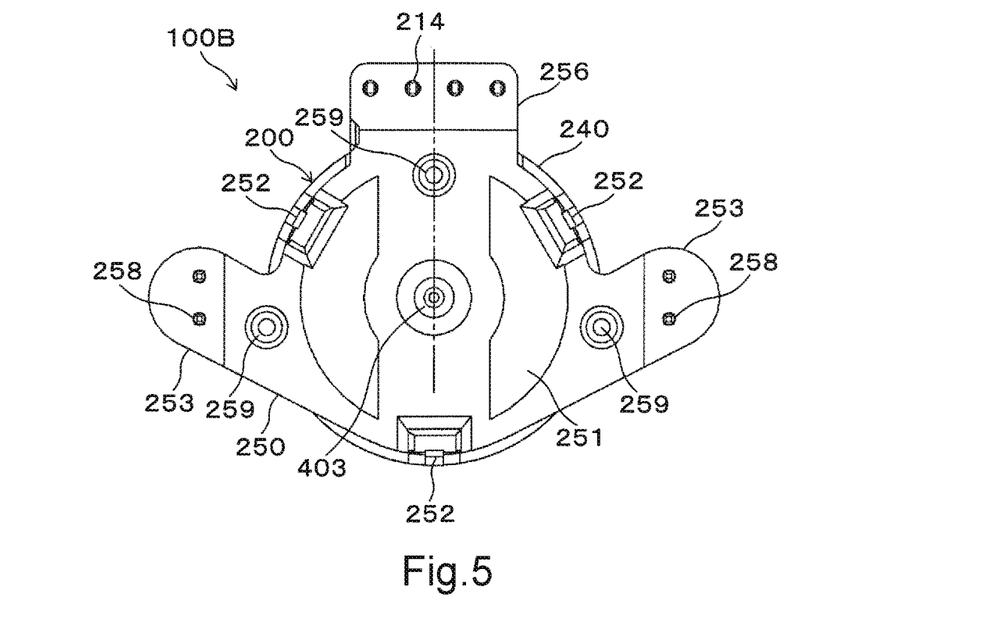
FIG. 5 A front view of the stepping motor according to the other embodiment.

In FIG. 4 and FIG. 5, a terminal block part 256 is integrally formed on the upper portion of the disk portion 251. Similarly to the first embodiment, four terminal pins 214 extending in the axial direction are embedded in the terminal block part 256. Furthermore, positioning pins 259 that extend in the axial direction are integrally formed on root portions of the flange parts 253 with respect to the disk portion 251 and a portion below the terminal block part 256, respectively. The three positioning pins 259 are arranged at a pitch of about 90° in a circumferential direction, but the number of positioning pins is not limited to three. Furthermore, a pair of upper and lower securing pins 258 that protrude in the axial direction are secured in the vicinity of the tip end portions of the flange parts 253, respectively. The securing pins 258 are metal members formed in a substantially U-shape, similarly to the securing pins 258 in the first embodiment, and are press-fitted and secured in respective holes that are provided in the flange parts 253. The securing pins 258 are arranged to be substantially line-symmetrical with respect to a line (two-dot chain line in FIG. 5) passing through the center of the shaft 403 and the middle point of the terminal block part 256 as a symmetrical axis.

The terminal pins 214, the securing pins 258, and the positioning pins 259 are used to secure the stepping motor 100B to the circuit board 600 illustrated in FIG. 6. A positioning hole 606, the contact hole 602, and the pin securing hole 604 are formed in the circuit board 600. In addition, an insertion hole 607 for the shaft 403 is also formed in the circuit board 600. In the stepping motor 100B, the front plate 250 is fitted to the circuit board 600 in a state in which the shaft 403 is inserted into the insertion hole 607, the positioning pin 259 is inserted into the positioning hole 606, the terminal pin 214 is inserted into the contact hole 602, and the securing pin 258 is inserted into the pin securing hole 604. The copper foil 603 forming a printed pattern that is formed around the contact hole 602 and the terminal pin 214 are connected by soldering, and the copper foil 605 that is formed around the pin securing hole 604 and the securing pin 258 are connected by soldering, whereby the stepping motor 100B is secured to the circuit board 600.

The stepping motor 100B is soldered to the circuit board 600 at three portions including a portion secured by the four terminal pins 214 that are fixed to the terminal block part 256 and two portions secured by the securing pins 258 that are secured to the respective flange parts 253. Therefore, a securing structure having good balance can be obtained without causing an excessive load to the joining portion of the terminal pins 214. As a result, the strength of the attachment of the stepping motor 100B can be increased. Note that the front plate 250 of the second embodiment is not provided with the boss part 216 in the first embodiment, but the front plate 250 of the second embodiment may be provided with a similar boss part so that the boss part is fitted to and secured to the insertion hole 607 in the front plate 250. In this case, the attachment strength can be further increased.

The stepping motor 100B of the second embodiment also has a structure in which axial rattling at the rotor 400 is suppressed. That is, as illustrated in FIG. 6, a projection 710 in an annular shape is integrally formed around the bearing hole 255 in the inner surface of the front plate 250, and the coil spring 800 in a compressed state is interposed between the front plate 250 and the rotor member 402 in a state in which the coil spring 800 is fitted on the shaft 403 in the projection 710. Washers 901 and 902 made of a material such as a resin with good slidability are interposed between the coil spring 800 and the front plate 250 and between the coil spring 800 and the rotor member 402, respectively. Similarly, the washer 903 is interposed between the rotor member 402 and the end plate 350. The rotor member 402 is urged toward the end plate 350 through the coil spring 800, and the rotor member 402 is always pressed against the end plate 350 through the washer 903.

The projection 710 is provided with a plurality of bosses 711 (in this case, three) that are formed at an equal interval at the tip edge portion of the projection 710, similarly to the first embodiment, and the maximum height of the projection 710 is set to be higher than the solid height of the coil spring 800.

Also in the second embodiment similarly to the first embodiment, with this structure, axial rattling at the rotor 400 can be absorbed, thereby suppressing the occurrence of noise, and the simple structure can suppress increase in cost. Since the height of the projection 710 including the boss 711 in which the coil spring 800 is accommodated is higher than the solid height of the coil spring 800, the damage to the coil spring 800 can be also prevented.

The present invention can be used for a stepping motor.

LIST OF REFERENCE SIGNS

100A, 100B stepping motor,
200 front side stator assembly (stator),
210, 250 front plate,
213, 256 terminal block part,
214 terminal pin,
218, 258 securing pin,
231 coil,
253 flange part,
255, 355 bearing hole,
255a, 355a inner peripheral surface of bearing hole (supporting portion),
300 end side stator assembly (stator),
310, 350 end plate (another member),
400 rotor,
403 shaft,
600 circuit board (securing member),
700, 710 projection,
701, 711 boss of projection,
800 coil spring,
H projection height

The invention claimed is:

1. A stepping motor comprising:
a rotor having a shaft;
a stator that is arranged in proximity to the rotor; and
a plate that is arranged to face one end side of the rotor in an axial direction and has a supporting portion for supporting the shaft,
wherein the plate has a projection being integrally formed in an annular shape on a surface facing the rotor, the projection protruding toward the rotor and surrounding the shaft,
a coil spring is provided to be interposed between the plate and the rotor in a state in which the coil spring is fitted on the shaft on an inner side of the projection, and to urge the rotor toward another end in the axial direction to elastically press the rotor against another member, and
a plurality of bosses are integrally formed on the surface of the projection and surrounding the coil spring.

2. The stepping motor according to claim 1, wherein an axial height of the projection protruding toward the rotor is higher than a solid height of the coil spring.

3. The stepping motor according to claim 1, wherein the plate includes a terminal block part and a flange part, a terminal pin is provided on the terminal block part, a coil of the stator is to be connected to the terminal pin, and
the flange part is provided with a securing pin for securing the plate to a securing member.

4. The stepping motor according to claim 3, wherein the flange part of the plate extends in a radial direction, and a plurality of the flange parts are formed.

5. The stepping motor according to claim 1, wherein the another member is a plate that is arranged on another end side of the rotor in the axial direction.

6. A stepping motor comprising:
a rotor having a shaft;
a stator that is arranged in proximity to the rotor; and
a plate that is arranged to face one end side of the rotor in an axial direction and has a supporting portion for supporting the shaft,
wherein the plate has a projection being integrally formed in an annular shape on a surface facing the rotor, the projection protruding toward the rotor and surrounding the shaft,
a coil spring is provided to be interposed between the plate and the rotor in a state in which the coil spring is fitted on the shaft on an inner side of the projection, and to urge the rotor toward another end in the axial direction to elastically press the rotor against another member,
a plurality of bosses are integrally formed on the surface of the projection and surrounding the coil spring, and
a part of the coil spring protrudes toward the rotor from the bosses of the projection.

7. The stepping motor according to claim 6, wherein an axial height of the projection protruding toward the rotor is higher than a solid height of the coil spring.

8. The stepping motor according to claim 6, wherein the boss is formed in a circular-arc shape.

9. The stepping motor according to claim 6, wherein the rotor comprises the shaft, a rotor member and a rotor magnet secured to an outer surface of the rotor member, and the coil spring is disposed between the plate and the rotor member.

* * * * *